United States Patent
Takatera et al.

[11] Patent Number: 6,159,638
[45] Date of Patent: *Dec. 12, 2000

[54] SOLID POLYMER ELECTROLYTE AND PREPARATION METHOD THEREFOR

[75] Inventors: Tsutomu Takatera; Naoto Nishimura, both of Kitakatsuragi-gun; Takehito Mitate, Yamatotakada; Kazuaki Minato, Osaka, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/080,198

[22] Filed: May 18, 1998

[30] Foreign Application Priority Data

Jul. 24, 1997 [JP] Japan ................... 9-198820

[51] Int. Cl.$^7$ ........................................... H01M 6/18
[52] U.S. Cl. .................. 429/309; 429/307; 429/316; 429/317
[58] Field of Search ..................... 429/307, 309, 429/316, 317

[56] References Cited

U.S. PATENT DOCUMENTS

| | | | |
|---|---|---|---|
| 5,429,891 | 7/1995 | Gozdz et al. | 429/192 |
| 5,548,055 | 8/1996 | Narang et al. | 528/25 |
| 5,783,331 | 7/1998 | Inoue et al. | 429/217 |
| 5,789,108 | 8/1998 | Chu | 429/213 |
| 5,830,600 | 11/1998 | Narang et al. | 429/192 |

FOREIGN PATENT DOCUMENTS

| | | |
|---|---|---|
| 0766329 A1 | 4/1997 | European Pat. Off. |
| 6-140051 | 5/1994 | Japan |
| 6-150941 | 5/1994 | Japan |
| 08-165395 | 6/1996 | Japan |
| 8-148613 | 7/1996 | Japan |
| 08-236095 | 9/1996 | Japan |
| 10-077401 | 3/1998 | Japan |
| 63-102014 | 5/1998 | Japan |

*Primary Examiner*—Yogendra Gupta
*Assistant Examiner*—John R. Hardee
*Attorney, Agent, or Firm*—Nixon & Vanderhye

[57] ABSTRACT

A solid polymer electrolyte having a high ionic conductivity and a high mechanical strength, and a preparation method therefor. The solid polymer electrolyte comprises a metal salt and a polymer blend of a fluoropolymer and a polyether comprising either or both of an ethylene oxide unit and a propylene oxide unit as a monomeric unit.

11 Claims, 3 Drawing Sheets

SOLID POLYMER ELECTROLYTE AND PREPARATION METHOD THEREFOR

CROSS-REFERENCE TO RELATED APPLICATIONS

This application is related to Japanese application No. HEI9(1997)-198820, filed on Jul. 24, 1997 whose priority is claimed under 35 USC § 119, the disclosure of which is incorporated by reference in its entirety.

BACKGROUND OF THE INVENTION

1. Field of the Invention

The present invention relates to a solid polymer electrolyte and a preparation method therefor. More particularly, the present invention relates to a solid polymer electrolyte which is superior in ionic conductivity and mechanical strength, and a preparation method therefor. The solid polymer electrolyte according to the present invention is suitable for electrochemical devices such as batteries, particularly for secondary batteries of high energy density.

2. Description of the Prior Art

As electronic and information systems increasingly feature size reduction and portability, research and development is now being made on light-weight and high-voltage secondary batteries, among which metal lithium secondary batteries are promising power sources for these systems because of their light weight and high energy density. In general, such a lithium battery employs metal lithium as its negative electrode and a nonaqueous electrolytic solution containing a lithium salt as its electrolyte.

It is, however, known that dendrites (branching tree-like crystals) are generated on the metal lithium during repeated charge and discharge cycles when it uses metal lithium as negative electrode for lithium secondary battery, resulting in a short circuit within the battery and deterioration of the cycle characteristic of the battery.

Attention is now focused on lithium ion secondary batteries, which have already been put to practical use. Such a lithium ion secondary battery employs, instead of the metal lithium negative electrode, a negative electrode which comprises a host such as of a carbon material and lithium ions and utilizes an intercalation and deintercalation reaction of the lithium ions in the host. The lithium ion secondary battery generally has a lower theoretical negative electrode capacity than the metal lithium secondary battery, but is superior in the cycle characteristic and reliability.

In general, the lithium secondary batteries (including the metal lithium secondary batteries and the lithium ion secondary batteries) employ organic electrolytic solutions as their electrolytes. However, the use of such a liquid electrolyte imposes problems associated with the reliability of the battery, e.g., deterioration of the battery which may result from leakage of the electrolytic solution out of the battery, vaporization of a solvent of the electrolytic solution and dissolution of an electrode material in the electrolytic solution. Further, the organic electrolytic solution contains a flammable organic solvent and, hence, the leakage of the solvent may result in ignition.

There is a demand for a battery which employs a solid electrolyte composed of an inorganic material or a polymeric material and is free from the solution leakage out of the battery. Particularly, a solid electrolyte composed of a polymeric material (hereinafter referred to as "solid polymer electrolyte") has the advantages of relatively easy preparation, low costs and light weight. The solid polymer electrolyte is attractive because totally solid batteries featuring a smaller thickness and a shape variation can be provided by employing the solid polymer electrolyte.

The solid polymer electrolyte is highly safe, but has a lower ionic conductivity than the conventional organic electrolytic solutions. Exemplary polymers currently used for the solid polymer electrolyte include polyethers such as polyethylene oxide and polypropylene oxide. Since linear polymers such as polyethylene oxide and polypropylene oxide are crystalline polymers, a solid polymer electrolyte composed of such a polymer and an electrolytic salt has a satisfactory ionic conductivity at a high temperature, but a low ionic conductivity at a temperature not higher than ordinary temperature.

A known approach to the problem of the reduction in the ionic conductivity is to use an amorphous polymer obtained by cross-linking polyethylene oxide and/or polypropylene oxide into a graft structure or a network structure.

However, a solid polymer electrolyte composed of such an amorphous polymer still has a lower ionic conductivity than the organic electrolytic solution, and does not exhibit a satisfactory ionic conductivity at a temperature not higher than ordinary temperature.

To further improve the ionic conductivity, an organic solvent is added to the aforesaid ion conductive polymer to such an extent that exudation of the organic solvent does not occur, or the ion conductive polymer is formed into a thin film for reduction of the resistance of the entire ion conductor. A totally solid battery employing a solid polymer electrolyte thus obtained has a reduced internal resistance.

However, the solid polymer electrolyte composed of the polymer cross-linked into a network structure is superior in the ionic conductivity, but has a very low mechanical strength. Therefore, if the solid polymer electrolyte is employed for a battery, the solid polymer electrolyte may be damaged by pressure applied thereto during fabrication of the battery or during the charge and discharge process of the battery.

To solve this problem, various solid polymer electrolytes are proposed.

For example, Japanese Unexamined Patent Publication No. SHO 63(1988)-102104 proposes a composite solid polymer electrolyte obtained by impregnating an electrolytic polymer such as polyethylene oxide in a polymeric porous film such as of a polycarbonate or polyvinyl chloride. Japanese Unexamined Patent Publication No. HEI 8(1996)-148163 proposes a composite solid polymer electrolyte containing a powdery insulative material such as glass or a ceramic or a powdery ion conductive material dispersed therein. Further, Japanese Unexamined Patent Publications No. HEI6(1994)-140051 and No. HEI6(1994)-150941 propose solid polymer electrolytes composed of a polymer blend of polyvinyl alcohol and polyethylene oxide or a copolymer of vinyl alcohol and ethylene oxide.

However, these solid polymer electrolytes suffer the following drawbacks.

The composite solid polymer electrolyte (ion conductor) comprising the polymeric porous film and the polymeric electrolyte has a greater resistance because the content of the electrolyte component serving for ion conduction is reduced. Therefore, if the composite solid polymer electrolyte is employed for a battery, a reduction in the battery capacity and an increase in the internal resistance may result.

Further, the composite solid polymer electrolyte containing the powdery glass or ceramic dispersed therein has a high mechanical strength, but the preparation thereof is costly because an additional step for particle size classification of the particles is required for formation of a homogenous solid polymer electrolyte film.

The solid polymer electrolyte composed of the polymer blend of polyvinyl alcohol and polyethylene oxide or the copolymer of vinyl alcohol and ethylene oxide is excellent in the ionic conductivity and the mechanical strength. However, hydroxyl groups in polyvinyl alcohol are reactive with lithium. Therefore, if the solid polymer electrolyte is employed for a metal lithium battery or a lithium ion battery, the hydroxyl groups react with lithium, so that it is difficult to maintain polyvinyl alcohol stable in the battery. Therefore, an electrode containing the solid polymer electrolyte has problems associated with the stability and cycle characteristic.

SUMMARY OF THE INVENTION

As the result of intensive studies, inventors of the present invention have found that the problems described above can be solved by the following means, and attained the present invention.

In accordance with one aspect of the present invention, there is provided a solid polymer electrolyte comprising a metal salt and a polymer blend of a fluoropolymer and a polyether having either or both of an ethylene oxide unit and a propylene oxide unit as a monomeric unit.

In accordance with another aspect of the present invention, there is provided a method for preparing a solid polymer electrolyte, comprising the steps of: dissolving a metal salt and a fluoropolymer in an organic solvent; mixing a polyether having either or both of an ethylene oxide unit and a propylene oxide unit as a monomeric unit with the resulting solution at an optimum temperature; irradiating the resulting mixture with ionizing radiation while maintaining the mixture at the optimum temperature; and removing the organic solvent as required.

DETAILED DESCRIPTION OF THE PREFERRED EMBODIMENTS

Figure 1:
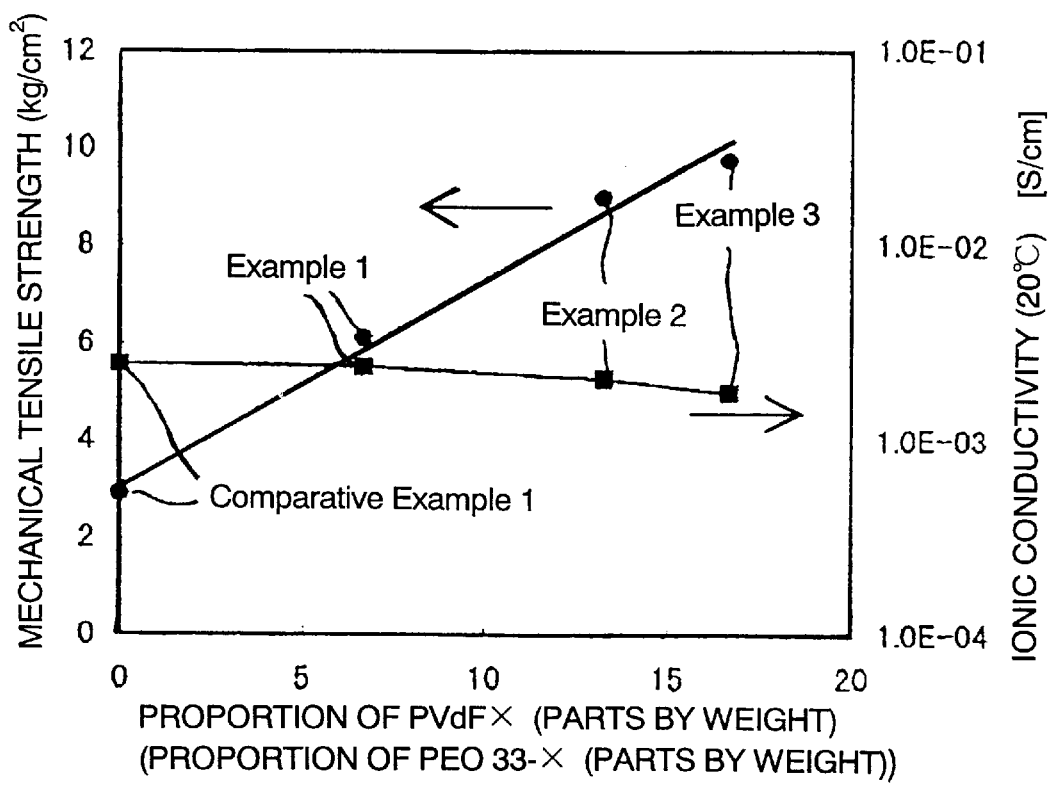
FIG. 1 is a graphical representation illustrating the relationships of the amount of added polyvinylidene fluoride versus the ionic conductivity and mechanical tensile strength.

A solid polymer electrolyte according to the present invention contains a metal salt, a fluoropolymer, and a polyether having either or both of an ethylene oxide unit and a propylene oxide unit as a monomeric unit and, as required, a nonaqueous solvent.

The polyether to be used in the present invention is not particularly limited, as long as the polymer has an ethylene oxide unit and/or a propylene oxide unit as a monomeric unit. Examples of specific polyethers include polyethylene oxide (e.g. polyethylene oxide diacrylate), polypropylene oxide (e.g. polypropylene oxide diacrylate), a polymer blend of polyethylene oxide and polypropylene oxide, a copolymer (block copolymer and/or random copolymer) of ethylene oxide and propylene oxide, a graft copolymer having a backbone of polysiloxane or polyphosphazene and side chains of polyethylene oxide and/or polypropylene oxide having a relatively low molecular weight on the order of about 100 to 10,000, preferably about 100 to 1,000, and polymers obtained by cross-linking polymers having ethylene oxide units and/or propylene oxide units into a network structure (hereinafter sometimes referred to as "cross-linked network polymers").

It is particularly preferred to use a cross-linked network polymer comprising polyethylene oxide and/or polypropylene oxide as the polyether in the present invention. It is known that, when polyethylene oxide or polypropylene oxide having a weight-average molecular weight of greater than 200,000 is heated in a nonaqueous solvent (e.g., carbonate solvent) more than 50° C., the viscosity thereof steeply rises. On the other hand, a certain quantity of heat should be applied to dissolve the fluoropolymer in the carbonate solvent. Therefore, it is difficult to homogeneously blend the fluoropolymer and the aforesaid high molecular weight polymer to obtain a polymer blend. For this reason, it is preferred to use a polyether which does not undergo the aforesaid drastic change nor decomposition even if a required quantity of heat is applied thereto. More specifically, the polyether preferably has a low molecular weight, more preferably a weight-average molecular weight of 1,000 to 50,000, at a stage where the polyether is blended with the fluoropolymer in the carbonate solvent.

The polyether may be solidified, for example, by irradiation with ionizing radiation. The solidification may be achieved by cross-linking the polyether to increase the molecular weight of the polymer. The solidification is preferably performed, for example, after the polyether is applied on a base, so that the solid polymer electrolyte can be formed into a desired configuration. The solid polymer electrolyte composed of the cross-linked network polyether is superior in the mechanical strength. Further, even if a considerable amount of a nonaqueous solvent is contained in the solid polymer electrolyte, the solid polymer electrolyte is free from exudation of the nonaqueous solvent. Thus, the solid polymer electrolyte has a high ionic conductivity even at ordinary temperature. As described above, the cross-linked network polymer of polyethylene oxide and/or polypropylene oxide is particularly preferred as the polyether to be used in the present invention.

The fluoropolymer to be used in the present invention is not particularly limited, as long as it is soluble in a particular organic solvent within such a temperature range that no drastic chemical change occurs in the polyether due to decomposition or polymerization of the polyether. Examples of specific fluoropolymers include homopolymers such as polyvinylidene fluoride, polyvinyl fluoride, polytetrafluoroethylene and polyhexafluoropropylene, and copolymers and terpolymers derived from plural kinds of monomers selected from the group consisting of vinylidene fluoride, vinyl fluoride, tetrafluoroethylene and hexafluoropropylene. In the present invention, polyvinylidene fluoride is particularly preferred because it is highly soluble in the organic solvent and highly compatible with the metal salt. Further, the polyvinylidene fluoride preferably has a weight-average molecular weight of 10,000 to 1,000,000, more preferably 100,000 to 500,000, for a high mechanical strength and a high solubility in the solvent.

The weight ratio of the fluoropolymer to the polyether is preferably 10 to 100 parts by weight relative to 100 parts by weight of the polyether. If the proportion of the fluoropolymer is smaller than 10 parts by weight, the mechanical strength of the resulting solid polymer electrolyte is not satisfactory. If the proportion is greater than 100 parts by weight, the ionic conductivity of the resulting solid polymer electrolyte is undesirably reduced.

The metal salt to be used in the present invention is not particularly limited, as long as it serves as an electrolyte for a battery. Examples of specific metal salts include lithium perchlorate ($LiClO_4$), lithium hexafluorophosphate ($LiPF_6$), lithiumborofluoride ($LiBF_4$), lithium trifluoromethanesulfonate ($LiCF_3SO_3$), lithium bis(trifluoromethylsulfonyl)imide ($Li(CF_3SO_2)_2N$), a lithium tris(trifluoromethylsulfonyl)methide ($Li(CF_3SO_2)_3C$), sodium perchlorate ($NaClO_4$), sodium borof luoride ($NaBF_4$), magnesium perchlorate ($Mg(ClO_4)_2$) and magnesium borofluoride ($Mg(BF_4)_2$). These metal salts may be used either alone or as a mixture.

The weight ratio of the metal salt to the polymer blend is preferably 5 to 100 parts by weight relative to 100 parts by weight of the polymer blend. If the proportion of the metal salt is smaller than 5 parts by weight, the ionic conductivity of the resulting solid polymer electrolyte is undesirably reduced because a smaller number of carrier ions are present in the solid polymer electrolyte. If the proportion is greater than 100 parts by weight, the metal salt is not sufficiently dissociated in the resulting solid polymer electrolyte, and the crystallinity of the polymer blend at ordinary temperature is undesirably increased because of a rise in the glass transition temperature thereof.

A nonaqueous solvent is preferably added to the polymer blend to impart the solid polymer electrolyte with an ionic conductivity high enough for practical use.

Examples of specific nonaqueous solvents include solvents having high dielectric constants, such as ethylene carbonate (EC), propylene carbonate (PC), butylene carbonate (BC), γ-butyrolactone (BL) and γ-valerolactone (VL), and solvents having low viscosities, such as 1,2-dimethoxyethane (DME), ethoxymethoxyethane (EME), 1,2-diethoxyethane (DEE), dimethyl carbonate (DMC), ethyl methyl carbonate (EMC), diethyl carbonate (DEC), tetrahydrofuran (THF), 2-methyltetrahydrofuran (2MeTHF) and dioxane (DO). These solvents may be used either alone or as a mixture. To increase the ionic conductivity of the solid polymer electrolyte, it is preferred to use a solvent mixture containing a cyclic carbonate solvent having a high dielectric constant and a low viscosity solvent in a desired mixing ratio. As the high dielectric constant solvent, propylene carbonate and ethylene carbonate are preferably used either alone or as a mixture for minimization of environmental influences.

Among the aforesaid low viscosity solvents, linear carbonate solvents such as dimethyl carbonate (DMC), ethyl methyl carbonate (EMC) and diethyl carbonate (DEC) are preferred. The linear carbonate solvents are highly stable with respect to metal lithium or a carbon material containing lithium ions intercalated thereto, when the resulting solid polymer electrolyte is employed as an electrolyte of a totally solid battery.

The nonaqueous solvent is preferably contained in the polymer blend in such a proportion that the concentration of the metal salt can be adjusted to 0.001 to 5.0 moles/liter, more preferably 0.05 to 2.0 moles/liter. If the metal salt concentration is lower than 0.001 mole/liter, the ionic conductivity of the resulting solid polymer electrolyte is undesirably reduced due to shortage of carrier ions. If the metal salt concentration is higher than 5.0 moles/liter, the ionic conductivity of the resulting polymeric electrolyte is undesirably reduced because the metal salt is not sufficiently dissociated.

The weight ratio of the polymer blend to the nonaqueous solvent is preferably 30 to 100 parts by weight relative to 100 parts by weight of the nonaqueous solvent. If the proportion of the polymer blend is smaller than 30 parts by weight, the exudation of the nonaqueous solvent may result, making it difficult to shape the resulting solid polymer electrolyte as desired. Even if the shaping of the solid polymer electrolyte is possible, the electrolyte may have an insufficient mechanical strength. If the proportion of the polymer blend is greater than 100 parts by weight, the effect of addition of the nonaqueous solvent cannot be expected for ensuring a high ionic conductivity.

A method for preparing the solid polymer electrolyte according to the present invention will hereinafter be described.

First, the fluoropolymer and the metal salt are dissolved in an organic solvent in which the fluoropolymer and the metal salt are soluble. If the fluoropolymer are less soluble in the solvent at ordinary temperature, the solvent is preferably heated so that the fluoropolymer can completely be dissolved in the solvent.

The fluoropolymer dissolvable organic solvent is preferably capable of dissolving a required amount of the metal salt therein and less volatile at an elevated temperature at which the fluoropolymer is soluble therein. It is preferred that the organic solvent can readily be removed after the resulting solid polymer electrolyte is formed into a film. Examples of specific organic solvents include N-methylpyrrolidone, acetonitrile, acetone, dimethylformamide, dimethylacetamide, acetylacetone, cyclohexanone, ethyl methyl ketone, dimethylaminopropylamine, hexamethylphosphoramide and diethylenetriamine in addition to the nonaqueous solvents described above. Where the solid polymer electrolyte containing the nonaqueous solvent is to be prepared, the organic solvent capable of dissolving the fluoropolymer and the metal salt therein is preferably selected from the nonaqueous solvents described above. Among the aforesaid organic solvents, a solvent stable with respect to an electrode is particularly preferred.

For subsequent solidification of the polymer blend by ionizing radiation, aphoto-polymerization initiator may be added to the organic solvent. Examples of specific photo-polymerization initiators include carbonyl compounds such as benzoyl compounds, sulfur compounds and onium salts. The photo-polymerization initiator is preferably used in a proportion of 0.1 to 5.0 parts by weight relative to 100 parts by weight of the polyether.

Thereafter, the polyether is mixed with the resulting fluoropolymer solution at a temperature optimum for the fluoropolymer and the polyether. The mixing is preferably carried out speedily.

For shaping of the solid polymer electrolyte, the resulting mixture is applied on a substrate, spread on a template, or injected into a sealed vessel, and then irradiated with ionizing radiation at the optimum temperature for solidification thereof. The solidification of the mixture occurs because the polymerization degree of the polyether is increased by the cross-linking of the polyether. The application of the mixture can be achieved by spreading the mixture on a substrate such as of glass, aluminum or a stainless steel with a doctor blade, a roller coater, a bar coater or the like. The ionizing radiation may be active light radiation such as ultraviolet radiation (UV).

The temperature optimum for the fluoropolymer and the polyether ranges from a lower limit temperature at which the fluoropolymer solution is not solidified, to an upper limit temperature at which the polyether is not decomposed or thermally polymerized. It is preferred that the substrate, the template or the sealed vessel to be used for formation of the film of the solid polymer electrolyte is preliminarily heated to the optimum temperature. As required, the resulting solid polymer electrolyte may be freed of the organic solvent by desiccation in vacuo or at ordinary temperature.

The solid polymer electrolyte according to the present invention is applicable to any of various batteries such as primary batteries and secondary batteries, and suitable for totally solid primary and secondary batteries, particularly for totally solid secondary batteries. For example, the solid polymer electrolyte can be used for a totally solid secondary battery having a construction as described below.

Used as a positive electrode for the totally solid secondary battery is an electrode including a positive electrode collector and a composite positive electrode material applied on the positive electrode collector and composed of a positive electrode active material, a conductor, a binder and an ion conductive solid polymer electrolyte containing a metal salt.

The positive electrode active material is not particularly limited, but may be composed of an oxide of at least one metal selected from the group consisting of cobalt, nickel, vanadium, manganese, niobium and the like. $LiCoO_2$, $LiNiO_2$, $LiMn_2O_4$ are particularly preferred. Other exemplary positive electrode active materials include chalcogen compounds such as titanium disulfide and molybdenum disulfide, and electron conductive polymeric compounds such as polypyrrole and polyaniline.

The conductor for the positive electrode is not particularly limited, but examples thereof include carbon materials such as carbon black, acetylene black and Ketchen black, powdery graphite materials (natural graphite and artificial graphite), powdery metals and fibrous metals.

The binder for the positive electrode is not particularly limited, but examples thereof include fluoropolymers such as polytetrafluoroethylene and polyvinylidene fluoride, polyolefine polymers such as polyethylene, polypropylene and ethylene-propylene-diene terpolymer, and styrene-butadiene rubber.

The solid polymer electrolyte according to the present invention can be used as the metal-salt-containing ion conducting solid polymer electrolyte for the positive electrode.

The positive electrode collector is not particularly limited, but exemplary materials for the collector include metals, metal alloys and carbon materials, more specifically, titanium, aluminum and stainless steels.

Used as a negative electrode for the totally solid secondary battery is an electrode including a negative electrode collector and a composite negative electrode material applied on the negative electrode collector and composed of a negative electrode active material, a binder and an ion conductive polymeric electrolyte containing a metal salt.

The negative electrode active material is not particularly limited, but lithium, lithium alloys and/or substances capable of absorbing and desorbing lithium are preferably used as the negative electrode active material. Examples of specific negative electrode active materials include (1) metal lithium and lithium alloys such as lithium aluminum alloys, lithium tin alloys, lithium lead alloys and Wood's alloys; (2) substances which can electrochemically be doped and dedoped with lithium ions, such as conductive polymers (e.g., polyacetylene, polythiophene, polyparaphenylene and the like), pyrolytic carbon materials, carbon materials pyrolyzed in a gas phase in the presence of a catalyst, carbon materials obtained by baking pitch, coke, tar and the like, and carbon materials obtained by baking polymers such as cellulose, a phenolic resin and the like; (3) graphite materials (natural graphite, artificial graphite, expansive graphite and the like) which can be intercalated and deintercalated with lithium ions; and (4) inorganic compounds ($WO_2$, $MoO_2$ and the like) which can be doped and dedoped with lithium ions. These materials may be used either alone or as a composite thereof.

The binder for the negative electrode is not particularly limited, but examples thereof include fluoropolymers such as polytetrafluoroethylene and polyvinylidene fluoride, polyolefine polymers such as polyethylene, polypropylene and ethylene-propylene-diene terpolymer, and styrene-butadiene rubber.

The solid polymer electrolyte according to the present invention can be used as the metal-salt-containing ion conductive polymeric electrolyte for the negative electrode.

The negative electrode collector is not particularly limited, but exemplary materials for the collector include metals and metal alloys, more specifically, copper, nickel and stainless steels.

The shape of the battery is not particularly limited, but the battery may be of a coin type, a button type, a sheet type, a cylindrical type, a square type or the like.

In accordance with the present invention, a solid polymer electrolyte is provided which is stable with respect to metal lithium or a lithium absorbable or insertable carbon material and has a high ionic conductivity and stability within a wide temperature range.

Since the solid polymer electrolyte exhibits a high mechanical strength, the electrolyte is insusceptible to damage which may otherwise result from pressure applied thereto during fabrication of a battery or during the charge and discharge process of the battery. Therefore, the thickness of the ion conductive solid polymer electrolyte can be reduced. Further, the solid polymer electrolyte also functions as a separator and, hence, there is no need to provide a separator such as of a polyethylene nonwoven fabric between electrodes in the totally solid battery, unlike in a battery utilizing a liquid electrolyte. The solid polymer electrolyte, if having a reduced thickness, has a correspondingly reduced resistance.

For fabrication of a battery, all components of the battery should be accommodated within a battery case of a predetermined volume. By employing the solid polymer electrolyte having a reduced thickness, a space to be occupied by the electrolyte in the battery can be reduced. Therefore, correspondingly larger volumes of electrode active materials can be used so that the energy density of the battery can be increased. Since the solid polymer electrolyte according to the present invention has a high mechanical strength, the battery performance can be enhanced.

By thus employing the solid polymer electrolyte according to the present invention, a totally solid battery can be provided which has a high energy density, superior battery characteristics in a wide temperature range, and a long charge and discharge cycle lifetime.

EXAMPLES

The present invention will hereinafter be described more specifically by way of examples and comparative examples thereof. In the examples and comparative examples, the ionic conductivity and the mechanical tensile strength were determined in the following manner:

Ionic conductivity

The ionic conductivity of a sample was determined at 20° C. by the AC impedance method with the sample held between blocking electrodes of nickel.

Mechanical Tensile Strength

A sample having a known size was stretched at a low stretching rate of 5 cm/min with opposite ends thereof held by a tensile strength test machine, and a load applied to the sample when the sample was torn was measured for determination of the mechanical tensile strength of the sample.

Examples 1 to 3

At a temperature of about 120° C., 6.7 parts by weight of polyvinylidene fluoride having a weight-average molecular weight of about 300,000 was completely dissolved in 100 parts by weight of a propylene carbonate solution containing lithium perchlorate in a concentration of 1 mole/liter. The resulting solution was cooled to about 105° C., and then 26.7 parts by weight of a polyether (polyethylene oxide diacrylate) having a weight-average molecular weight of about 5,000 was added to the solution and mixed by stirring. The resulting solution was spread on a template, and solidified by cross-linking the polyether by UV radiation. Thus, a solid polymer electrolyte of Example 1 was prepared.

Solid polymer electrolytes of Examples 2 and 3 were prepared in substantially the same manner as in Example 1, except that 13.3 parts by weight of polyvinylidene fluoride and 20.0 parts by weight of the polyether were used in Example 2 and 16.7 parts by weight of polyvinylidene fluoride and 16.7 parts by weight of the polyether were used in Example 3.

Relationships of the amount of polyvinylidene fluoride contained in the solid polymer electrolyte versus the ionic conductivity and mechanical tensile strength of the solid polymer electrolyte according to Examples 1 to 3 are shown in FIG. 1.

The solid polymer electrolytes of Examples 1 to 3 were pressed to such an extent that the electrolytes were not destroyed. At this time, exudation of propylene carbonate (nonaqueous solvent) was not observed.

Further, the solid polymer electrolytes of Examples 1 to 3 were kept in contact with metal lithium for 30 days. As a result, any chemical change in the solid polymer electrolytes and metal lithium was not observed. This indicates that the solid polymer electrolytes had a high chemical stability with respect to metal lithium.

Comparative Example 1

First, 33 parts by weight of a polyether (polyethylene oxide diacrylate) having a weight-average molecular weight of about 5,000 was added to 100 parts by weight of a propylene carbonate solution containing lithium perchlorate in a concentration of 1 mole/liter, and mixed by stirring. Then, the resulting solution was spread on a template, and solidified by cross-linking the polyether by UV radiation. Thus, a solid polymer electrolyte was prepared. The ionic conductivity and mechanical tensile strength of the solid polymer electrolyte are shown in FIG. 1.

FIG. 1 indicates that the mechanical tensile strength increases as the amount of polyvinylidene fluoride contained in the electrolyte is increased. FIG. 1 also indicates that, even if the amount of polyvinylidene fluoride is increased, the ionic conductivity is kept virtually unchanged. This indicates that the addition of polyvinylidene fluoride enhances the mechanical tensile strength without changing the ionic conductivity.

Comparative Example 2

At a temperature of 120° C. to 130° C., 33 parts by weight of polyvinylidene fluoride having a weight-average molecular weight of about 300,000 was completely dissolved in 100 parts by weight of a propylene carbonate solution containing lithium perchlorate in a concentration of 1 mole/liter. The resulting solution was spread on a template, and naturally cooled. Thus, a solid polymer electrolyte was prepared.

When the solid polymer electrolyte was slightly pressed, the solution exuded from the electrolyte. Therefore, the solid polymer electrolyte cannot be measured the ionic conductivity and the mechanical tensile strength.

Comparative Example 3

A mixture containing 100 parts by weight of polyvinyl alcohol having a weight-average molecular weight of 22,000 and 100 parts by weight of polyethylene oxide having a weight-average molecular weight of 500,000 was pressed into a film having a thickness of 0.5 mm. The film was immersed in a propylene carbonate solution containing lithium perchlorate in a concentration of 1 mole/liter at 50° C. for 24 hours, and then the resulting film was dried. Thus, a solid polymer electrolyte was prepared.

The film was kept in contact with metal lithium for 10 days. As a result, the metal lithium was chemically changed by a chemical reaction.

As can be understood from the results in Examples 1 to 3 and Comparative Examples 1 to 3, the solid polymer electrolytes according to the present invention each had a high ionic conductivity and a high mechanical strength and were superior in the chemical or electrochemical stability and the long-term reliability. The use of the cross-linked network polyether facilitated the preparation of the solid polymer electrolyte, and made it possible for the solid polymer electrolyte to maintain a satisfactory mechanical strength. Further, even where the solid polymer electrolyte contained the organic solvent in such a great amount that a weight ratio of the solvent to the polymer is 100:30 (parts by weight), the exudation of the solvent did not occur. Therefore, if the solid polymer electrolyte according to the present invention is employed for an electrochemical device, particularly for a battery, the electrochemical device is expected to have a reduced internal resistance and an improved reliability.

Example 4

At a temperature of about 120° C., 13.3 parts by weight of polyvinylidene fluoride having a weight-average molecular weight of about 100,000 was completely dissolved in 100 parts by weight of a mixture consisting of ethylene carbonate and dimethyl carbonate in a volume ratio of 1:1 dissolving lithium hexafluorophosphate in a concentration of 0.5 mole/liter. The resulting solution was cooled to about 105° C., and then 20.0 parts by weight of a polyether (polyethylene oxide diacrylate) having a weight-average molecular weight of about 20,000 was added to the solution and mixed by stirring. The resulting solution was spread on a template, and solidified by cross-linking the polyether by UV radiation. Thus, a solid polymer electrolyte of Example 4 was prepared.

An ionic conductivity of the solid polymer electrolyte at 20° C. was $1.4 \times 10^{-3}$ S/cm.

Example 5

6.7 parts by weight of polyvinylidene fluoride having a weight-average molecular weight of about 500,000 and 26.7 parts by weight of polyether (polyethylene oxide diacrylate) having a weight-average molecular weight of about 2,000 were mixed and dissolved in N-methylpyrrolidone. The resulting solution was spread on a template, solidified by cross-linking the polyether by UV radiation, dried under the reduced pressure at 100° C. for 3 hours to remove the solvent completely, and immersed in a mixture consisting of ethylene carbonate and diethyl carbonate in a volume ratio of 1:1 containing lithium perchlorate in a concentration of 2.0 mole/liter for 24 hours. After the obtained solid polymer electrolyte was taken out and then exposed in a dry box for about 5 hours, an ionic conductivity of the solid polymer electrolyte was measured. The ionic conductivity of the solid polymer electrolyte at 20° C. was $1.2 \times 10^{-3}$ S/cm.

Examples 6 to 9

A mixture of 75 wt % of a polymer electrolyte mixture consisting of lithium perchlorate, polyvinylidene fluoride having a weight-average molecular weight of about 300,000 and a polyether (polyethylene oxide diacrylate) having a weight-average molecular weight of about 5,000 in a weight ratio of 4:6:9 with 25 wt % of a nonaqueous mixed solvent of ethylene carbonate and diethyl carbonate in a volume ratio of 1:1 was spread on a template, and solidified by cross-linking the polyether by UV radiation. Thus, a solid polymer electrolyte of Example 6 was prepared in substantially the same manner as in Examples 1 to 3.

Solid polymer electrolytes of Examples 7, 8 and 9 were prepared in substantially the same manner as in Example 6, except that a mixture of 50 wt % of a polymer electrolyte mixture with 50 wt % of a nonaqueous mixed solvent was used in Example 7, a mixture of 75 wt % of a polymer electrolyte mixture with 25 wt % of a nonaqueous mixed solvent was used in Example 8, and amixture of 15 wt % of a polymer electrolyte mixture with 85 wt % of a nonaqueous mixed solvent was used in Example 9.

Figure 2:
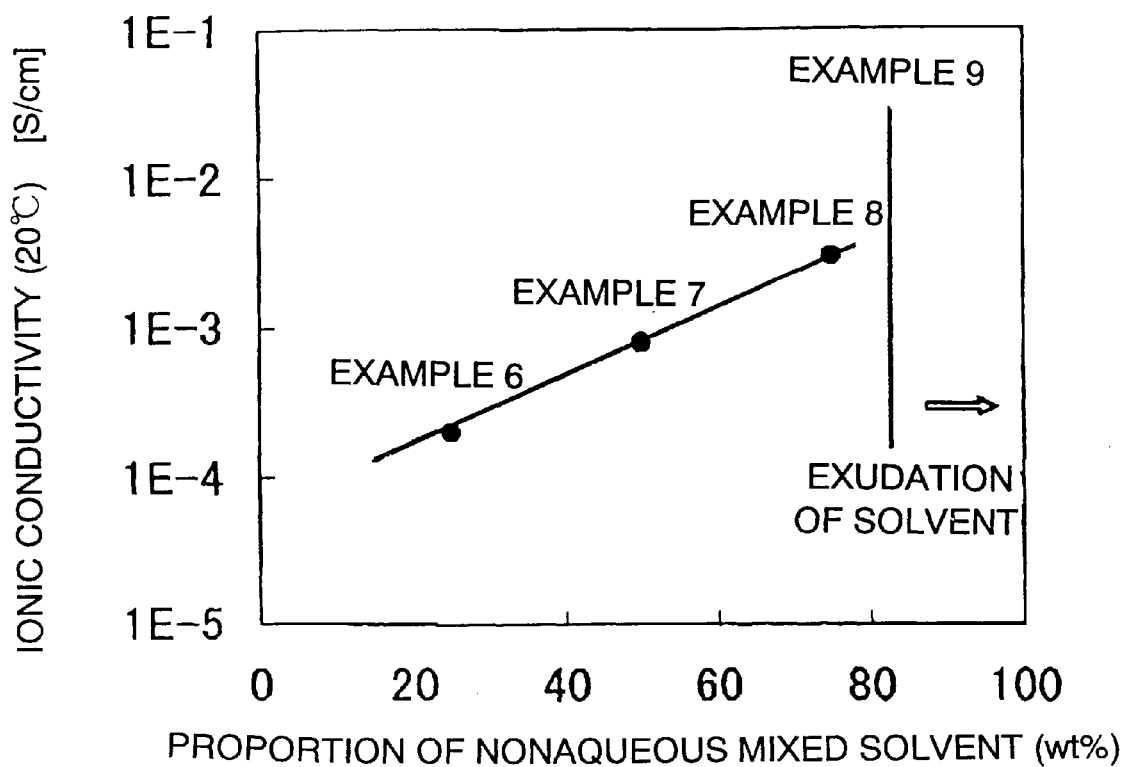
FIG. 2 is a graphical representation illustrating the relationship of a proportion of a nonaqueous mixed solvent versus an ionic conductivity of the solid polymer electrolyte.

Relationships of the proportion of the nonaqueous mixed solvent in the solid polymer electrolyte versus the ionic conductivity of the solid polymer electrolyte according to Examples 6 to 9 are shown in FIG. 2.

As is apparent from FIG. 2, it can be seen that the more the proportion of the nonaqueous mixed solvent increases, the more the ionic conductivity of the solid polymer electrolyte increases. However, it was observed that the solvent was exuded from the solid polymer electrolyte when the proportion of the nonaqueous mixed solvent became 85 wt %.

Example 10

Evaluation of Battery

Figure 3:
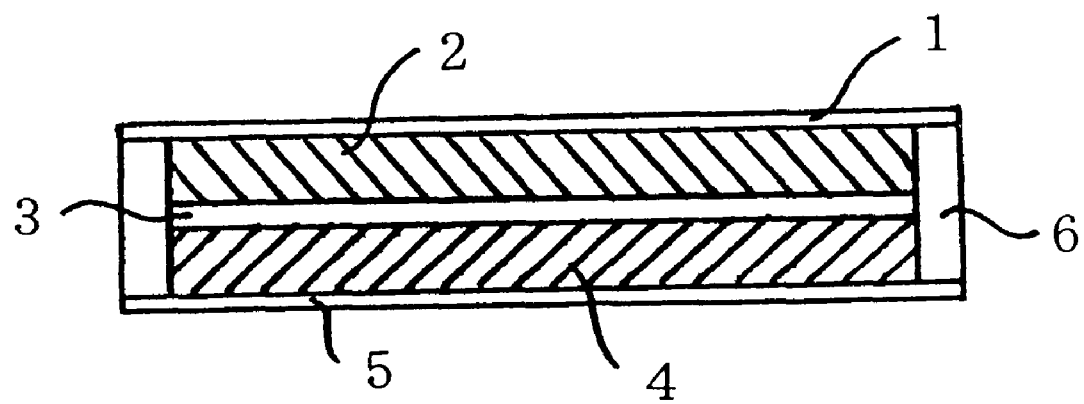
FIG. 3 is a sectional view of a thin battery of Example 10 according to the present invention.

A thin battery as shown in FIG. 3 was fabricated. Used for a positive electrode were aluminum for a positive electrode collector, $LiCoO_2$ for a positive electrode active material, and acetylene black for a conductor. Used for a negative electrode were copper for a negative electrode collector and carbon powder for a negative electrode active material.

The thin battery thus fabricated was evaluated through a charging/discharging cycle test in which the battery was charged up to a limit charged voltage of 4.2 V and discharged to a limit discharged voltage of 2.7 V at a constant current of 0.1 $mA/cm^2$.

Hereafter, a procedure for fabricating the thin battery will be described.

Preparation of Positive Electrode 100 parts by weight of $LiCoO_2$ was mixed with 10 parts by weight of acetylene black and 10 parts by weight of polyvinylidene fluoride followed by adding N-methylpyrrolidone to form a slurry. The slurry casted on aluminum by a screen coating method was dried under the reduced pressure to remove the solvent completely. Accordingly, a positive electrode sheet was fabricated which was 40 $cm^2$ in area and weighted 170 mg.

Preparation of Negative Electrode 100 parts by weight of carbon powder was mixed with 10 parts by weight of polyvinylidene fluoride followed by adding N-methylpyrrolidone to form a slurry. The slurry casted on copper by a screen coating method was dried under the reduced pressure to remove the solvent completely. Accordingly, a negative electrode sheet was fabricated which was 40 $cm^2$ in area and weighted 110 mg.

Preparation of Electrolyte

In the same manner as in Examples 1 to 3, a mixture of 13.3 parts by weight of polyvinylidene fluoride having a weight-average molecular weight of about 300,000 dissolved in 100 parts by weight of a mixture consisting of ethylene carbonate and diethyl carbonate in a volume ratio of 1:1 dissolving lithium perchlorate in a concentration of 1.0 mole/liter with 20.0 parts by weight of a polyether (polyethylene oxide diacrylate) having a weight-average molecular weight of about 5,000 was casted on each electrode by the screen coating method, and solidified by cross-linking the polyether by UV radiation.

Preparation of Battery

By contacting two electrodes thus fabricated each other, sealing an edge of them with a sealer made of modified polypropylene and covering them with a aluminum laminated film, the thin battery was fabricated.

10 cells of the thin battery thus fabricated were evaluated through a charging/discharging cycle test. As a result, the discharge capacity of the battery was an average of 20.2 mAh per cell in the first charging/discharging cycle and an average of 19.5 mAh per cell in the 50th cycle.

Comparative Example 4

10 cells of a thin battery were prepared in substantially the same manner as in Example 10, except that a solid polymer electrolyte was prepared by mixing only 33.0 parts by weight of a polyether (polyethylene oxide diacrylate) having a weight-average molecular weight of about 5,000 with 100 parts by weight of a mixture consisting of ethylene carbonate and diethyl carbonate in a volume ratio of 1:1 containing lithium perchlorate in a concentration of 1.0 mole/liter. These batteries thus fabricated were evaluated through a charging/discharging cycle test.

As a result, the tests of 3 of 10 cells were canceled because the performance of these cells had remarkably fallen off during the test. As for the rest of 7 cells, the discharge capacity of the battery was an average of 19.8 mAh per cell in the first charging/discharging cycle and an average of 19.0 mAh per cell in the 50th cycle.

From these results, it can be imagined that because of a high mechanical strength, the solid polymer electrolyte including polyvinylidene fluoride could stand the effect of the change of the electrodes occurred during the charging and discharging process, therefore the performance of the battery had not fallen at all during the test.

As described above, the solid polymer electrolyte according to the present invention contains a polymer blend of a fluoropolymer and a polyether comprising an ethylene oxide unit and/or a propylene oxide unit as a monomeric unit. Therefore, the solid polymer electrolyte exhibits an enhanced mechanical strength as well as a high ionic conductivity. Further, a battery employing the solid polymer electrolyte according to the present invention has a smaller thickness and a lower internal resistance, and is superior in the chemical or electrochemical stability and the long-term reliability.

Where a nonaqueous solvent is contained in the polymer blend, the solid polymer electrolyte has an ionic conductivity high enough for practical use, and maintains a satisfactory mechanical strength.

Further, the solid polymer electrolyte can readily be prepared through the preparation method according to the present invention, which includes the steps of mixing a polyether and a fluoropolymer and irradiating the resulting mixture with ionizing radiation. The preparation method is thus simplified without the need for copolymerization of the polyether and the fluoropolymer.

What is claimed is:

1. A solid polymer electrolyte comprising a metal salt, a nonaqueous solvent and a polymer blend of a fluoropolymer and a cross-linked polyether comprising either or both of an ethylene oxide unit and a propylene oxide unit as a monomeric unit.

2. A solid polymer electrolyte of claim 1, wherein the fluoropolymer is contained therein in a proportion of 10 to 100 parts by weight relative to 100 parts by weight of the polyether.

3. A solid polymer electrolyte of claim 1, wherein the metal salt is a lithium salt.

4. A solid polymer electrolyte of claim 1, wherein the fluoropolymer is soluble in the nonaqueous solvent.

5. A solid polymer electrolyte of claim 4, wherein the fluoropolymer is polyvinylidene fluoride.

6. A solid polymer electrolyte of claim 1, wherein the polyether is polyethylene oxide diacrylate.

7. A solid polymer electrolyte of claim 1, wherein the nonaqueous solvent is ethylene carbonate, propylene carbonate, butylene carbonate, γ-butyrolactone, γ-valerolactone, 1,2-dimethoxyethane, ethoxymethoxyethane, 1,2-diethoxyethane, dimethyl carbonate, ethyl methyl carbonate, diethyl carbonate, tetrahydrofuran, 2-methyltetrahydrofuran or dioxane.

8. A solid polymer electrolyte of claim 1, wherein a weight-average molecular weight of the polyether ranges from 1,000 to 50,000.

9. A solid polymer electrolyte of claim 1, wherein a weight-average molecular weight of the fluoropolymer ranges form 10,000 to 100,000.

10. A solid polymer electrolyte of claim 3, wherein the lithium salt is lithium perchlorate, lithium hexafluorophosphate, lithium borofluoride, lithium trifluoromethanesulfonate, a lithium salt of bis (trifluoromethylsulfonyl)imide, a lithium salt of tris (trifluoromethylsulfonyl)methide, sodium perchlorate, sodium borofluoride, magnesium perchlorate or magnesium borofluoride.

11. A method for preparing a solid polymer electrolyte, comprising the steps of: dissolving a metal salt and a fluoropolymer in a nonaqueous solvent; mixing a polyether comprising either or both of an ethylene oxide unit and a propylene oxide unit as a monomeric unit with the resulting solution; and irradiating the resulting mixture with ionizing radiation for solidification thereof.

* * * * *